US012002413B2

(12) United States Patent
Kim et al.

(10) Patent No.: US 12,002,413 B2
(45) Date of Patent: Jun. 4, 2024

(54) DISPLAY DEVICE AND DIMMING DRIVING METHOD THEREOF

(71) Applicant: Samsung Display Co., LTD., Yongin-si (KR)

(72) Inventors: Hong Soo Kim, Yongin-si (KR); Myung Woo Lee, Yongin-si (KR); Suk Hun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/176,910

(22) Filed: Mar. 1, 2023

(65) Prior Publication Data

US 2023/0326400 A1 Oct. 12, 2023

(30) Foreign Application Priority Data

Apr. 6, 2022 (KR) ........................ 10-2022-0043075

(51) Int. Cl.
*G09G 3/32* (2016.01)

(52) U.S. Cl.
CPC ....... *G09G 3/32* (2013.01); *G09G 2320/0633* (2013.01); *G09G 2330/028* (2013.01)

(58) Field of Classification Search
CPC .. G09G 3/2081; G09G 3/3233; G09G 3/2014; G09G 3/2022; G09G 3/3258; G09G 3/32; G09G 2330/028; G09G 2300/0861; G09G 2320/0626; G09G 2320/0633
See application file for complete search history.

(56) References Cited

U.S. PATENT DOCUMENTS

| | | | | |
|---|---|---|---|---|
| 7,649,516 B2 * | 1/2010 | Azami | G09G 3/3266 | 345/82 |
| 9,183,803 B2 * | 11/2015 | Jeong | G09G 3/3406 | |
| 10,672,348 B2 | 6/2020 | Lin et al. | | |
| 11,043,171 B2 * | 6/2021 | Chen | G09G 3/3648 | |
| 11,410,595 B2 * | 8/2022 | Morita | H01L 25/167 | |
| 11,417,269 B2 * | 8/2022 | Choi | G09G 3/2025 | |
| 11,462,172 B2 * | 10/2022 | Park | G09G 3/3266 | |
| 11,482,165 B2 * | 10/2022 | Lee | G09G 3/2014 | |
| 11,521,546 B2 * | 12/2022 | Park | G09G 3/3225 | |
| 11,587,516 B2 * | 2/2023 | Kang | G09G 3/2081 | |
| 11,710,460 B2 * | 7/2023 | Park | G09G 3/3233 | 345/204 |
| 2013/0321483 A1 * | 12/2013 | You | G02F 1/134336 | 345/690 |
| 2015/0048744 A1 | 2/2015 | Shin et al. | | |
| 2015/0062188 A1 * | 3/2015 | Kang | G09G 3/3406 | 315/307 |

(Continued)

FOREIGN PATENT DOCUMENTS

KR 10-1175934 B1 8/2012

*Primary Examiner* — Vinh T Lam
(74) *Attorney, Agent, or Firm* — Lewis Roca Rothgerber Christie LLP

(57) ABSTRACT

A display device comprises a pixel configured to be driven in cycle periods during a frame period defined by a vertical start signal, and a display driver configured to divide a cycle period into subfields for driving, configured to control an amount of current flowing through the pixel and to control emission on-duties of the subfields, and configured to independently determine, for the cycle period, a reference duty that is a minimum emission on-duty set in the cycle period based on a dimming signal.

20 Claims, 10 Drawing Sheets

(56) References Cited

U.S. PATENT DOCUMENTS

| | | | | |
|---|---|---|---|---|
| 2019/0114964 | A1* | 4/2019 | Sung | G11C 19/28 |
| 2020/0211481 | A1* | 7/2020 | Lee | G09G 3/3648 |
| 2021/0059027 | A1* | 2/2021 | Lopez | G09G 3/2092 |
| 2021/0201793 | A1 | 7/2021 | Lin et al. | |
| 2022/0068224 | A1* | 3/2022 | Park | G09G 3/3233 |
| 2022/0208078 | A1* | 6/2022 | Choi | G09G 3/2025 |
| 2022/0319409 | A1* | 10/2022 | Park | G09G 3/3266 |
| 2023/0094230 | A1* | 3/2023 | Noh | G09G 3/3233 345/690 |
| 2023/0215364 | A1* | 7/2023 | Lim | G09G 3/3266 345/691 |
| 2023/0306907 | A1* | 9/2023 | Park | G09G 3/3233 |

* cited by examiner

FIG. 8

| | CASE1 | CASE2 | CASE3 | CASE4 |
|---|---|---|---|---|
| | R_DT (number of clocks) | R_DT (number of clocks) | R_DT (number of clocks) | R_DT (number of clocks) |
| CP1 | 20 | 20 | 20 | 20 |
| CP2 | 20 | 20 | 20 | 21 |
| CP3 | 20 | 20 | 21 | 21 |
| CP4 | 20 | 21 | 21 | 21 |
| On-duty ratio | 10% | 10%+a | 10%+b | 10%+c |

CASE1' CASE2' CASE3' CASE4'

| | current | current | current | current |
|---|---|---|---|---|
| CP1 | 50 | 50 | 50 | 50 |
| CP2 | 50 | 50 | 50 | 55 |
| CP3 | 50 | 50 | 55 | 55 |
| CP4 | 50 | 55 | 55 | 55 |
| Current average | 50 | 51.25 | 52.5 | 53.75 |

DISPLAY DEVICE AND DIMMING DRIVING METHOD THEREOF

CROSS-REFERENCE TO RELATED APPLICATION

This application claims priority to, and the benefit of, Korean Patent Application No. 10-2022-0043075 filed in the Korean Intellectual Property Office on Apr. 6, 2022, the entire contents of which are incorporated herein by reference.

BACKGROUND

1. Field

The present disclosure relates to a display device, and a dimming driving method thereof.

2. Description of the Related Art

Recently, as interest in information display is increasing, research and development on display devices are continuously made. For example, research is being developed to apply a display panel and a display device to a head mounted electronic device, a glasses-type electronic device, etc. to implement an augmented reality image or a virtual reality image.

SUMMARY

An aspect of the present disclosure provides a display device in which a subfield driving method is repeated for a plurality of cycle periods during one frame, and in which an on-duty of each of the cycle periods is individually controlled.

Another aspect of the present disclosure provides a dimming driving method of the display device.

It should be understood, however, that the present disclosure is not limited to the aspects described above, and various changes and modifications may be made without departing from the spirit and scope of the present disclosure.

To achieve an aspect of the present disclosure, a display device according to one or more embodiments of the present disclosure includes a pixel configured to be driven in cycle periods during a frame period defined by a vertical start signal, and a display driver configured to divide a cycle period into subfields for driving, configured to control an amount of current flowing through the pixel and to control emission on-duties of the subfields, and configured to independently determine, for the cycle period, a reference duty that is a minimum emission on-duty set in the cycle period based on a dimming signal.

The pixel may include an inorganic light emitting element.

The cycle period may include first to eighth subfields having different respective emission on-duties.

The frame period may include first to fourth cycle periods, wherein the display driver is configured to determine the emission on-duties of the first to eighth subfields of the first cycle period based on a first reference duty, to determine the emission on-duties of the first to eighth subfields of the second cycle period based on a second reference duty, to determine the emission on-duties of the first to eighth subfields of the third cycle period based on a third reference duty, and to determine the emission on-duties of the first to eighth subfields of the fourth cycle period based on a fourth reference duty.

A length of one of the first to fourth reference duties may be different from a length of another one of the first to fourth reference duties.

A length of the first reference duty and a length of the second reference duty may be different from each other, and lengths of the emission on-duties of the first to eighth subfields of the first cycle period are different from lengths of the emission on-duties of the first to eighth subfields of the second cycle period, respectively.

The display driver may include an oscillator configured to output a clock signal having a preset frequency, and an on-duty controller configured to determine clock numbers corresponding to the first to fourth reference duties in response to a dimming level included in the dimming signal, and configured to generate PWM signals respectively having the first to fourth reference duties based on counted value of the clock signal.

The on-duty controller may be configured to generate PWM signals supplied to the first to eighth subfields of the first cycle period based on the PWM signal having the first reference duty, respectively.

The PWM signals may be configured to be supplied to the pixel as control signals corresponding to emission periods corresponding to the emission on-duties of the pixel.

The display driver may further include a voltage generator configured to generate a PAM data voltage supplied to the pixel in writing periods of the first to eighth subfields, and a current controller configured to control a magnitude of the PAM data voltage for the first to fourth cycle periods in response to the dimming level.

A magnitude of one PAM data voltage supplied to the pixel during the first to fourth cycle periods may be different from a magnitude of another PAM data voltages supplied to the pixel during the first to fourth cycle periods.

A magnitude of the PAM data voltage supplied to the pixel during the first cycle period may be different from a magnitude of the PAM data voltage supplied to the pixel during the fourth cycle period.

A current flowing into a light emitting element of the pixel during the first cycle period may be different from a current flowing into the light emitting element of the pixel during the fourth cycle period.

A total emission period corresponding to a sum of the emission on-duties of the frame period may be about 30% or less of the frame period.

To achieve an aspect of the present disclosure, a dimming driving method of a display device according to embodiments of the present disclosure includes determining a first reference duty and a second reference duty, which are minimum emission on-duties set in a first cycle period and a second cycle period of a frame period, respectively, and which have different respective lengths, in response to a dimming level of a dimming signal, dividing the first cycle period into first to eighth subfields based on the first reference duty to drive, and dividing the second cycle period into first to eighth subfields based on the second reference duty to drive.

The first to eighth subfields may have different respective emission on-duties that correspond to an emission period of a pixel.

Respective lengths of the emission on-duties of the first to eighth subfields of the first cycle period may be different from respective lengths of the emission on-duties of the first to eighth subfields of the second cycle period.

The determining the first reference duty and the second reference duty may include determining a clock number of an output of an oscillator corresponding to the first reference duty, and a clock number of an output of the oscillator corresponding to the second reference duty, in response to the dimming level, and generating a PWM signal having the first reference duty and a PWM signal having the second reference duty by counting the clock number.

The method may further include determining a first PAM data voltage supplied to the pixel in the first cycle period, and a second PAM data voltage having a different magnitude than the first PAM data voltage and supplied to the pixel in the second cycle period, in response to the dimming level, supplying the first PAM data voltage to the pixel in the first cycle period, and supplying the second PAM data voltage to the pixel in the second cycle period.

The pixel may include an inorganic light emitting element, wherein a current flowing through the inorganic light emitting element during an emission period of the first cycle period is different from a current flowing through the inorganic light emitting element during an emission period of the second cycle period.

The display device and the dimming driving method thereof according to the embodiments of the present disclosure may subdivide or expand expressible dimming luminance while reducing or minimizing the dimming dynamic false contour of the subfield driving method in which the inorganic light emitting element emits light by varying the reference duty of the cycle periods of the frame period based on the dimming signal.

It should be understood, however, that the present disclosure is not limited to the aspects described above, and various changes and modifications may be made without departing from the spirit and scope of the present disclosure.

BRIEF DESCRIPTION OF THE DRAWINGS

FIG. 8 is a chart illustrating a change in an emission on-duty according to a change in reference duty.

DETAILED DESCRIPTION

Figure 1:
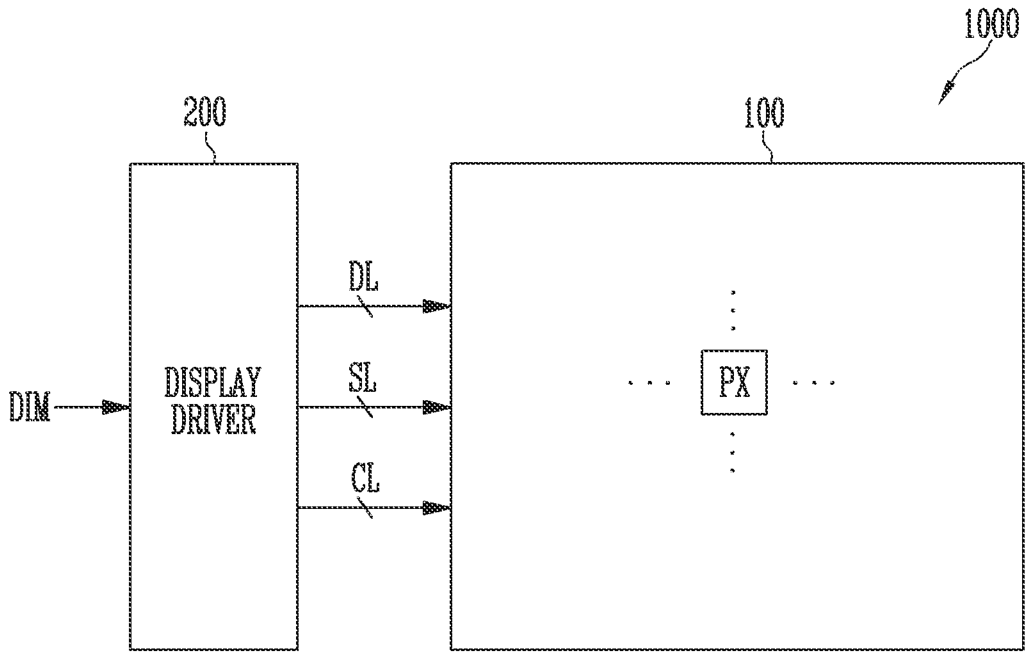
FIG. 1 is a block diagram illustrating a display device according to embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to embodiments of the present disclosure.

Referring to FIG. 1, a display device 1000 may include a display unit 100 and a display driver 200.

The display unit 100 may include pixels PX. Each of the pixels PX may be connected to data lines DL, scan lines SL, and control lines CL. Each of the pixels PX may emit light in one color of red, green, and blue.

In one or more embodiments, each of the pixels PX may include an inorganic light emitting element as a light emitting element and a pixel circuit for driving the inorganic light emitting element. However, this is an example, and the light emitting element is not limited thereto. For example, the light emitting element may include an organic light emitting element or a light emitting element (quantum dot display element) that emits light by changing a wavelength of light emitted using quantum dots.

The data lines DL may supply a pulse amplitude modulation (PAM) data voltage to the pixels PX. That is, a magnitude of a driving current of each of the pixels PX may be determined by the PAM data voltage. The scan lines SL may supply a scan signal to each of the pixels PX. The control lines CL may supply a control signal to each of the pixels PX. An emission period (or emission on-duty) of the pixels PX may be controlled based on a control signal.

The pixels PX may be driven in a plurality of cycle periods during one frame period defined by a vertical start signal. In addition, each cycle period may be divided into a plurality of subfields.

The display driver 200 may be electrically connected to the pixels PX through the data lines DL, the scan lines SL, and the control lines CL. The display driver 200 may drive the pixels PX.

The display driver 200 may control a subfield driving of the pixels PX. For example, each cycle period may include first to eighth subfields having different emission periods.

In one or more embodiments, the display driver 200 may adjust an amount of current (e.g., driving current) flowing through the pixels PX and an emission on-duty (e.g., emission period) of the subfields based on a dimming level included in a dimming signal DIM. For example, the display driver 200 may adjust a width of a pulse width modulation (PWM) signal that is a basis for generating a control signal for controlling the emission on-duty. Also, the display driver 200 may adjust the PAM data voltage to control the amount of current.

The dimming level may define the maximum luminance that the display unit 100 can emit. For example, when the dimming level is set to 1000 nits, the display unit 100 may emit light at the maximum of 1000 nits. When the dimming level is set to 100 nits, the display unit 100 may emit light at the maximum of 100 nits. For example, the dimming level may be set as an 8-bit digital value, and may be divided into the maximum of 256 steps. The dimming level may be determined or adjusted according to a user's dimming setting and the like.

A control of luminance according to the dimming level may be implemented through the emission on-duty (e.g., emission period) of the subfields and/or the control of the PAM data voltage as described above.

Figure 2:
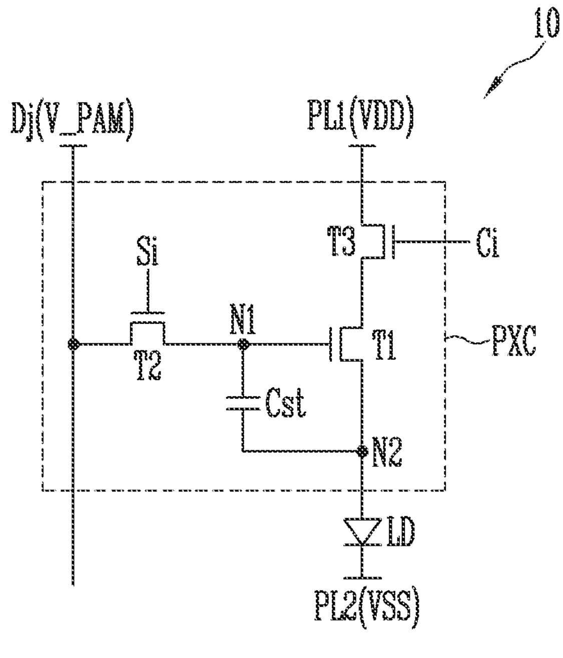
FIG. 2 is a circuit diagram for showing an example of a pixel included in the display device of FIG. 1.

FIG. 2 is a circuit diagram for showing an example of a pixel included in the display device of FIG. 1.

In FIG. 2, for convenience of description, the pixel 10 located on the i-th horizontal line (or the i-th pixel row) and connected to the j-th data line Dj (hereinafter referred to as a data line) is illustrated (i and j are natural numbers).

Referring to FIGS. 1 and 2, the pixel 10 may include a light emitting element LD and a pixel circuit PXC.

The light emitting element LD may be electrically connected between a first power line PL1 and a second power line PL2. A voltage of a first power source VDD may be provided to the first power line PL1, and a voltage of a second power source VSS may be provided to the second power line PL2. For example, a potential of the first power source VDD may be set to a higher potential than that of the second power source VSS.

The first end of the light emitting element LD may be electrically connected to the first power line PL1 via the pixel circuit PXC, and the second end of the light emitting element LD may be electrically connected to the second power line PL2. The light emitting element LD may emit light having a luminance corresponding to the driving current generated by the pixel circuit PXC.

In FIG. 2, one light emitting element LD is illustrated as being connected between the pixel circuit PXC and the second power line PL2, but this is exemplary and the pixel 10 may include a plurality of light emitting elements LD. For example, the light emitting elements LD may be connected between the pixel circuit PXC and the second power line PL2 in a parallel, series, or series/parallel mixed structure.

The light emitting element LD may be an inorganic light emitting diode having a micro size or a nano size.

In one or more embodiments, the pixel circuit PXC may include first to third transistors T1, T2, and T3 and a storage capacitor Cst.

The first transistor T1 (e.g., driving transistor) may be connected between the first power line PL1 for providing the voltage of the first power source VDD, and the first electrode of the light emitting element LD. A gate electrode of the first transistor T1 may be connected to a first node N1. The first transistor T1 may control the driving current supplied to the light emitting element LD in response to a voltage of the first node N1. For example, the first transistor T1 may generate the driving current based on the PAM data voltage V_PAM.

The PAM data voltage V_PAM may determine a magnitude of the driving current. The emission luminance of the light emitting element LD, which is an inorganic light emitting diode, may be less sensitive to a change in driving current than an organic light emitting diode. Accordingly, a fine adjustment of the emission luminance and/or the grayscale of the light emitting element LD may be more influenced by an emission time of the light emitting element LD than a magnitude of the driving current.

In one or more embodiments, the PAM data voltage V_PAM may be supplied with the same magnitude to the same type of sub-pixels for emitting light of the same color regardless of the grayscale (or image data, grayscale data). However, this is only an example, and the PAM data voltage V_PAM may change according to a reference, grayscale, and/or dimming level (e.g., predetermined reference, grayscale, and/or dimming level).

The second transistor T2 (e.g., switching transistor) may be connected between the data line Dj and the first node N1. A gate electrode of the second transistor T2 may be connected to the i-th scan line (hereinafter, referred to as a scan line).

The second transistor T2 may electrically connect the data line Dj and the first node N1 in response to a scan signal supplied to the scan line Si. Accordingly, the PAM data voltage V_PAM may be charged in the storage capacitor Cst.

The third transistor T3 (e.g., emission control transistor) may be connected between the first power line PL1 and the first transistor T1. The third transistor T3 may connect the first power line PL1 and the first transistor T1 in response to a control signal supplied to the i-th control line Ci (hereinafter, referred to as a control line).

When the third transistor T3 is turned on, a path of the current flowing through the light emitting element LD may be formed, and thus the light emitting element LD may emit light. For example, the emission time of the light emitting element LD may be determined based on the turn-on period of the third transistor T3. In other words, the emission on-duties of the light emitting element LD and the pixel 10 may be determined according to a time during which the control signal is supplied (e.g., on-duty of the control signal). In addition, the luminance corresponding to the dimming level may be implemented through the control of the emission on-duty.

One electrode of the storage capacitor Cst may be connected to the first node N1, and the other electrode thereof may be connected to a second node N2 (e.g., to the source electrode of the first transistor T1).

Meanwhile, in FIG. 2, all of the first, second, and third transistors T1, T2, and T3 are illustrated as n-type transistors, but the present disclosure is not limited thereto. That is, at least one of the first, second, and third transistors T1, T2, and T3 may be changed to a p-type transistor. Also, the structure of the pixel circuit PXC is not limited thereto.

For example, to reduce or minimize a deviation of the driving current between the pixels, the pixel circuit PXC may further include a transistor configuration for compensating for a threshold voltage of the first transistor T1. Also, the pixel circuit PXC may further include a configuration for initializing voltages of the first node N1 and/or the second node N2.

According to one or more embodiments, the control signal supplied through the control line Ci may be supplied from the display driver 200. For example, the display driver 200 may generate the control signal based on PWM signals.

In one or more embodiments, the pixel circuit PXC may further include a circuit that generates the control signal using the PWM signals generated by the display driver 200. For example, the pixel circuit PXC may generate the control signal using the PWM signals and may supply the control signal to the gate electrode of the third transistor T3.

Figure 3:
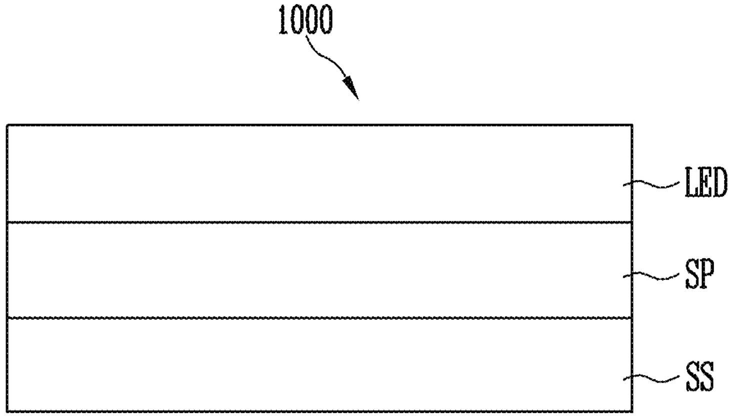
FIG. 3 is a cross-sectional view illustrating an example of a display device of FIG. 1.

FIG. 3 is a cross-sectional view illustrating an example of a display device of FIG. 1.

Referring to FIGS. 1, 2, and 3, the display device 1000 may include a silicon substrate SS, a semiconductor layer SP, and inorganic light emitting elements LEDs as a light emitting element LD.

The silicon substrate SS may include a single crystal silicon wafer, a polycrystalline silicon wafer, or an amorphous silicon wafer. The semiconductor layer SP may be formed on the silicon substrate SS through a semiconductor process. For example, the silicon substrate SS on which the semiconductor layer SP is formed may correspond to a base substrate for forming the display device 1000 as a silicon semiconductor substrate.

In one or more embodiments, the semiconductor layer SP may be formed on the silicon substrate SS through a complementary metal oxide semiconductor (CMOS) process. The semiconductor layer SP may include a CMOS type of pixel circuit. For example, the pixel circuit may include a CMOS circuit including a P-type transistor and an N-type transistor.

In addition, the semiconductor layer SP may include a driving circuit for driving the pixel circuit. For example, the semiconductor layer SP may further include a scan driving circuit having a CMOS type for driving the scan line. In addition, the semiconductor layer SP may include a data driving circuit for driving the data line. The semiconductor layer SP may include a control-line-driving circuit for driving the control line.

The inorganic light emitting elements LEDs may be provided on the semiconductor layer SP. The inorganic light emitting elements LEDs may be electrically connected to the pixel circuit of the semiconductor layer SP. The display device 1000 may be a display on silicon (DOS, or light emitting diode on silicon (LEDoS)) having a light emitting structure on the silicon semiconductor substrate.

In one or more embodiments, the inorganic light emitting elements LEDs may be provided on the semiconductor layer SP through a bonding process.

In one or more embodiments, a display-driving chip for driving the pixel circuit and the light emitting element LD may be further mounted on the semiconductor layer SP. For example, some components of the display driver 200 may be integrated on the semiconductor layer SP, and other components may be mounted on the semiconductor layer SP in a form of a driving chip.

Such a display-on silicon structure can be easily applied to wearable devices, such as smart glasses, and head mounted display devices, and the like. However, this is an example, and a field of application and a stacked structure of the display device 1000 are not limited thereto. For example, the display device 1000 may be applied to a portable device, such as a smart phone or a large display, such as a TV.

Figure 4:
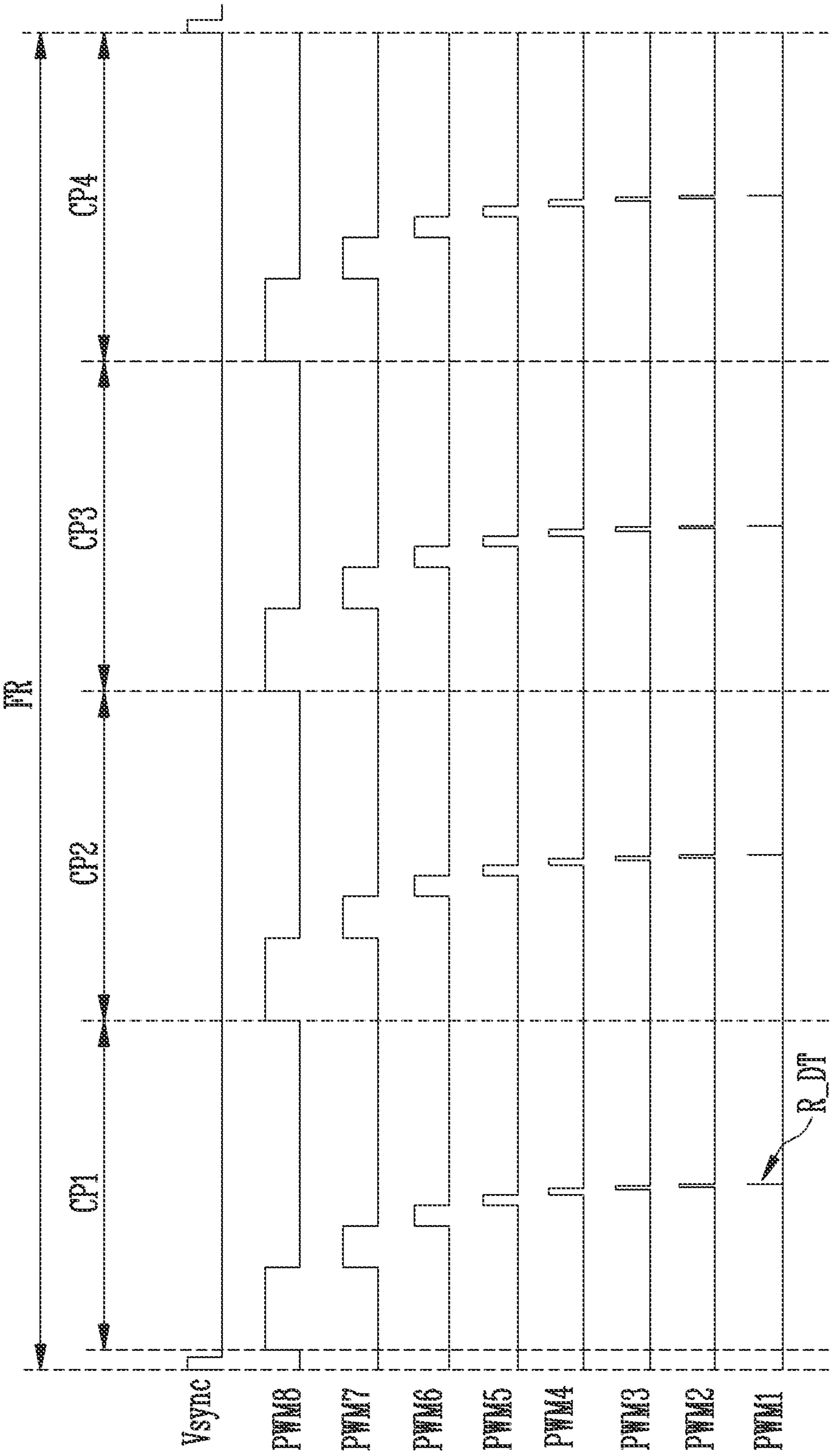
FIG. 4 is a timing diagram illustrating an example of PWM signals generated by a display driver included in a display device of FIG. 1.
Figure 5:
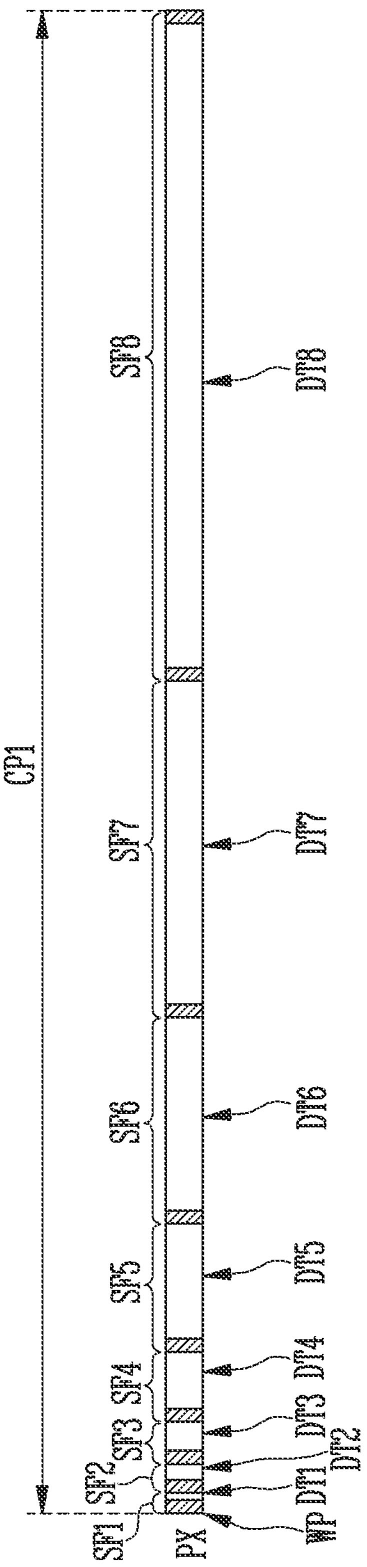
FIG. 5 is a drawing illustrating an example of subfield driving for the pixel of FIG. 2.

FIG. 4 is a timing diagram illustrating an example of PWM signals generated by a display driver included in the display device of FIG. 1, and FIG. 5 is a drawing illustrating an example of subfield driving for a pixel of FIG. 2.

Referring to FIGS. 1, 2, 4, and 5, the display device 1000 and the pixel 10 included therein may be driven in a plurality of cycle periods CP1, CP2, CP3, and CP4 during one frame period FR.

The frame period FR may be defined by a vertical start signal Vsync. For example, the vertical start signal Vsync may be provided corresponding to a driving frequency of the display device 1000.

In one or more embodiments, each of the cycle periods CP1, CP2, CP3, and CP4 may be divided into a plurality of subfields (e.g., SF1 to SF8) to be driven. As described above, because the light emitting element, which is an inorganic light emitting diode, is relatively insensitive to the driving current than the organic light emitting element, there are limits to control the luminance (hereinafter referred to as dimming luminance) corresponding to the dimming level through the control of the driving current. Accordingly, the subfield driving method may be used to control the dimming luminance of the display device 1000 through the control of the emission period. Each of the cycle periods CP1, CP2, CP3, and CP4 may include the same number of subfields.

In one or more embodiments, each of the cycle periods CP1, CP2, CP3, and CP4 may include first to eighth subfields SF1 to SF8. The subfield driving method may be implemented using 8-bit data. FIG. 5 shows an example in which the pixel 10 emits light in all of the first to eighth subfields SF1 to SF8.

For example, the first subfield SF1 may include an emission period corresponding to the writing period WP and the first emission on-duty DT1. Similarly, the second to eighth subfields SF2 to SF8 may include respective emission periods corresponding to the writing period WP, and may respectively include the second to eighth emission on-duties DT2 to DT8.

The first to eighth emission on-duties DT1 to DT8 may be different from each other. The first to eighth emission on-duties DT1 to DT8 may be determined by the first to eighth PWM signals PWM1 to PWM8 shown in FIG. 4, respectively. For example, the first to eighth emission on-duties DT1 to DT8 may correspond to pulse widths of the first to eighth PWM signals PWM1 to PWM8, respectively.

Here, the pulse widths of the first to eighth PWM signals PWM1 to PWM8 may be a level period for turning on a transistor (e.g., predetermined transistor), and may be logical high level periods of the first to eighth PWM signals PWM1 to PWM8.

In one or more embodiments, the first emission on-duty DT1 may be the shortest, and the emission period may increase toward the eighth emission on-duty DT8. The first emission on-duty DT1 may be a minimum emission on-duty set in the first cycle period CP1, and may be defined as a reference duty. The second to eighth emission on-duties DT2 to DT8 may correspond to periods that are multiples of the first emission on-duty DT1 that is the reference duty R_DT.

For example, the pulse width of the second PWM signal PWM2 may be about twice the pulse width of the first PWM signal PWM1, and the length of the second emission on-duty DT2 may be about twice the length of the first emission on-duty DT1. The pulse width of the third PWM signal PWM3 may be about twice the pulse width of the second PWM signal PWM2, and the length of the third emission on-duty DT3 may be about twice the length of the second emission on-duty DT2 (e.g., may be about four times the length of the first emission on-duty DT1). In this way, the pulse width of the eighth PWM signal PWM8 may be about 128 times the pulse width of the first PWM signal PWM1, and the length of the eighth emission on-duty DT8 may be about 128 times the length of the first emission on-duty DT1 (e.g., may be about twice the length of the seventh emission on-duty DT7).

As such, when the reference duty R_DT is determined in each cycle period, the first to eighth emission on-duties DT1 to DT8 may be automatically determined. For example, the first to eighth emission on-duties DT1 to DT8 of the first cycle period CP1 may be determined based on the reference duty R_DT (e.g., the first reference duty) of the first cycle period CP1, and the first to eighth emission on-duties of the second cycle period CP2 may be determined based on the reference duty (e.g., the second reference duty) of the second cycle period CP2. Similarly, the first to eighth emission on-duties of the third cycle period CP3 may be determined based on the reference duty (e.g., the third reference duty) of the third cycle period CP3, and the first to eighth emission on-duties of the fourth cycle period CP4 may be determined based on the reference duty (e.g., the fourth reference duty) of the fourth cycle period CP4. However, this is an example, and the relationship between the first to eighth PWM signals PWM1 to PWM8 is not limited thereto. Also, the order of the first to eighth emission on-duties DT1 to DT8 is not limited to the order shown in FIG. 5. For example, as shown in FIG. 4, the emission on-duties DT1 to DT8 may be performed in a reverse order of FIG. 5.

When the display device 1000 emits light with the full-white maximum luminance, the pixel 10 may emit light during a period corresponding to a sum of the maximum pulse widths of the first to eighth PWM signals PWM1 to PWM8. When the dimming luminance is decreased, the pulse widths of the first to eighth PWM signals PWM1 to PWM8 may be reduced, or the pixel 10 may emit light by some signals selected among the first to eighth PWM signals PWM1 to PWM8.

In one or more embodiments, a data voltage (e.g., PAM data voltage V_PAM) having the same magnitude may be supplied to the pixel 10 in each write period WP of the first cycle period CP1. Here, the PAM data voltage V_PAM may have a voltage value capable of emitting light from the light emitting element LD. It is possible to control light emission and non-emission of the pixel 10. That is, when the PAM data voltage V_PAM is supplied and the third transistor T3 is turned on, the light emitting element LD may emit light. When the PAM data voltage V_PAM is not supplied, the light emitting element LD may not emit light even if the third transistor T3 is turned on.

However, this is an example, and whether each of the subfields SF1 to SF8 emits light may be determined depending on whether the PAM data voltage V_PAM is supplied. For example, the PAM data voltage V_PAM may not be supplied during a portion of the writing period WP of each of the first to eighth subfields SF1 to SF8. In the subfield corresponding to the writing period WP during which the PAM data voltage V_PAM is not supplied, the light emitting element LD does not emit light. In this way, a grayscale and/or luminance (e.g., predetermined grayscale and/or luminance) may be implemented by additionally controlling whether each of the subfields SF1 to SF8 emit light through whether the PAM data voltage V_PAM is supplied, which may be called PAM driving.

The pixel 10 may implement the dimming luminance based on whether the first to eighth subfields SF1 to SF8 emit light.

When the subfield driving for the frame period FR is performed in a single cycle, a situation may occur in which a deviation between the emission period and the non-emission period between the pixel rows become very large. Due to the deviation between the emission period and the non-emission period, an unintentional boundary line, an image stain, etc., such as a dynamic false contour, may be recognized.

The frame period FR may be driven in a plurality of cycle periods CP1, CP2, CP3, and CP4 to improve the image visibility defect. That is, because the image is displayed by dividing the same emission period into a plurality of cycle periods CP1, CP2, CP3, and CP4 in the frame period FR, image strain, such as dynamic false contours, can be reduced.

In one or more embodiments, as shown in FIG. 4, the frame period FR may be divided into four cycle periods CP1, CP2, CP3, and CP4. However, this is an example, and the number of cycle periods is not limited thereto. In addition, FIG. 4 shows that in each of the cycle periods CP1, CP2, CP3, and CP4, the eighth PWM signal PWM8 is generated and output first, and the first PWM signal PWM1 is generated and output last. However, this is an example, and an output order of the first to eighth PWM signals PWM1 to PWM8 is not limited thereto.

Meanwhile, when the frame period FR is divided into the first to fourth cycle periods CP1 to CP4 to be driven, the image strain may be reduced, but a step of an expressible dimming luminance may be reduced. For example, when driving with four cycle periods CP1, CP2, CP3, and CP4, the maximum emission period that can be set to reduce or minimize dynamic false contour and to secure minimum emission luminance may be less than or equal to about 30% of a total length of the frame period FR. When this emission period is divided into four cycle periods CP1, CP2, CP3, and CP4, and when each of the cycle periods CP1, CP2, CP3, CP4 is divided into subfields in the form of a square of the reference duty R_DT to emit light, there may be a limit to the step of the expressible dimming level.

Therefore, it may be suitable to drive by subdividing the step of this dimming level. The display device 1000 according to embodiments of the present disclosure may be designed to vary the reference duty R_DT of each of the cycle periods CP1, CP2, CP3, and CP4 according to the dimming level of the dimming signal DIM. For example, when the reference duties R_DT of the first cycle period CP1 and the second cycle period CP2 are different, a length of the actual emission period in the frame period FR may vary, and the expressible dimming luminance can also be subdivided.

Figure 6:
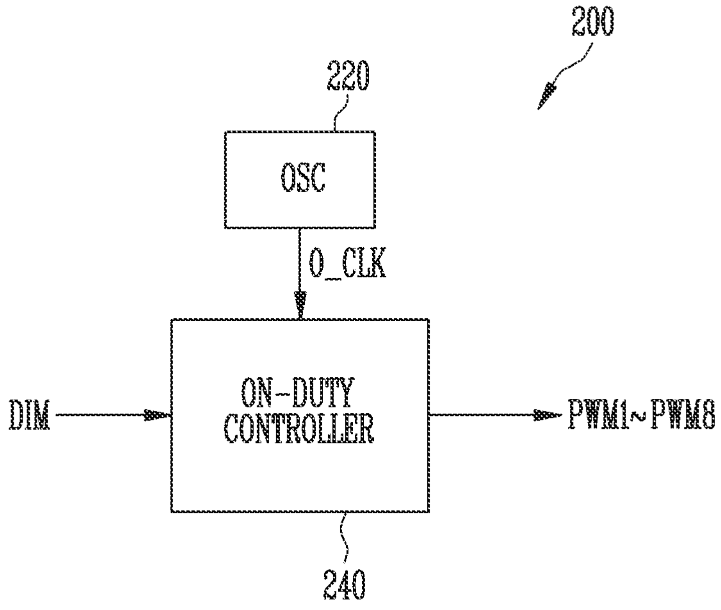
FIG. 6 is a block diagram illustrating an example of a display driver included in a display device of FIG. 1.
Figure 7:
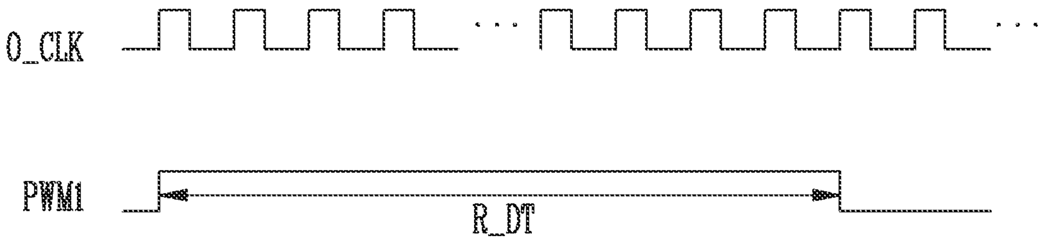
FIG. 7 is a timing diagram illustrating an example of an operation of a display driver of FIG. 6.

FIG. 6 is a block diagram illustrating an example of a display driver included in a display device of FIG. 1, and FIG. 7 is a timing diagram illustrating an example of an operation of a display driver of FIG. 6.

Referring to FIGS. 1, 4, 5, 6, and 7, the display driver 200 may include an oscillator 220 and an on-duty controller 240.

The oscillator 220 may output a clock signal O_CLK having a preset frequency. The oscillator 220 may be implemented with various types of well-known oscillator circuits. The first to eighth PWM signals PWM1 to PWM8 may be generated based on a timing of the clock signal O_CLK.

The on-duty controller 240 may determine clock numbers corresponding to the first to fourth reference duties of the first to fourth cycle periods CP1 to CP4 in response to the dimming level included in the dimming signal DIM, respectively. The length of the reference duty R_DT (e.g., pulse width of the first PWM signal PWM1) may be determined according to the clock number of the clock signal O_CLK. For example, a length (or pulse width) of some of the first to fourth reference duties may be different from a length (or pulse width) of others to implement a desired emission on-duty. However, this is only an example, and lengths of the first to fourth reference duties according to the dimming signal DIM may be substantially the same.

To determine the clock number as described above, the on-duty controller 240 may include a configuration, such as a memory including information on the clock number corresponding to the dimming level. For example, information on the clock number corresponding to the dimming level may be provided in the form of a lookup table. However, this is an example, and the configuration of determining the clock number of the reference duty R_DT based on the dimming signal DIM is not limited thereto.

The on-duty controller 240 may count the clock signal of the clock signal O_CLK. In one or more embodiments, the on-duty controller 240 may include a counting circuit that counts the clock signal O_CLK.

The on-duty controller 240 may generate the first PWM signal PWM1 based on a count value of the clock signal O_CLK. For example, when the clock number corresponding to the reference duty R_DT is determined to be 20, the reference duty R_DT of the first PWM signal PWM1 may correspond to a period in which a cycle of the clock signal O_CLK is repeated 20 times.

The clock numbers determined for each of the first to fourth cycle periods CP1 to CP4 may be independently (or variably) determined according to the dimming signal DIM. The on-duty controller 240 may generate the first PWM signal PWM1 in which the reference duty R_DT is varied in response to each of the first to fourth cycle periods CP1 to CP4.

Also, the on-duty controller 240 may generate the second to eighth PWM signals PWM2 to PWM8 of the first cycle period CP1 based on the first PWM signal PWM1 having the first reference duty. The pulse widths of the second to eighth PWM signals PWM2 to PWM8 may be determined based on the first reference duty.

Similarly, the on-duty controller 240 may generate the second to eighth PWM signals PWM2 to PWM8 of the second cycle period CP2 based on the first PWM signal PWM1 having the second reference duty. The on-duty controller 240 may generate the second to eighth PWM signals PWM2 to PWM8 of the third cycle period CP3 based on the first PWM signal PWM1 having the third reference duty, and may generate the second to eighth PWM signals PWM2 to PWM8 of the fourth cycle period CP4 based on the first PWM signal PWM1 having the fourth reference duty.

In one or more embodiments, the first to eighth PWM signals PWM1 to PWM8 may be provided to the pixel 10 through the control line (e.g., Ci in FIG. 2) as control signals corresponding to the emission period of the pixel 10.

Figure 9:
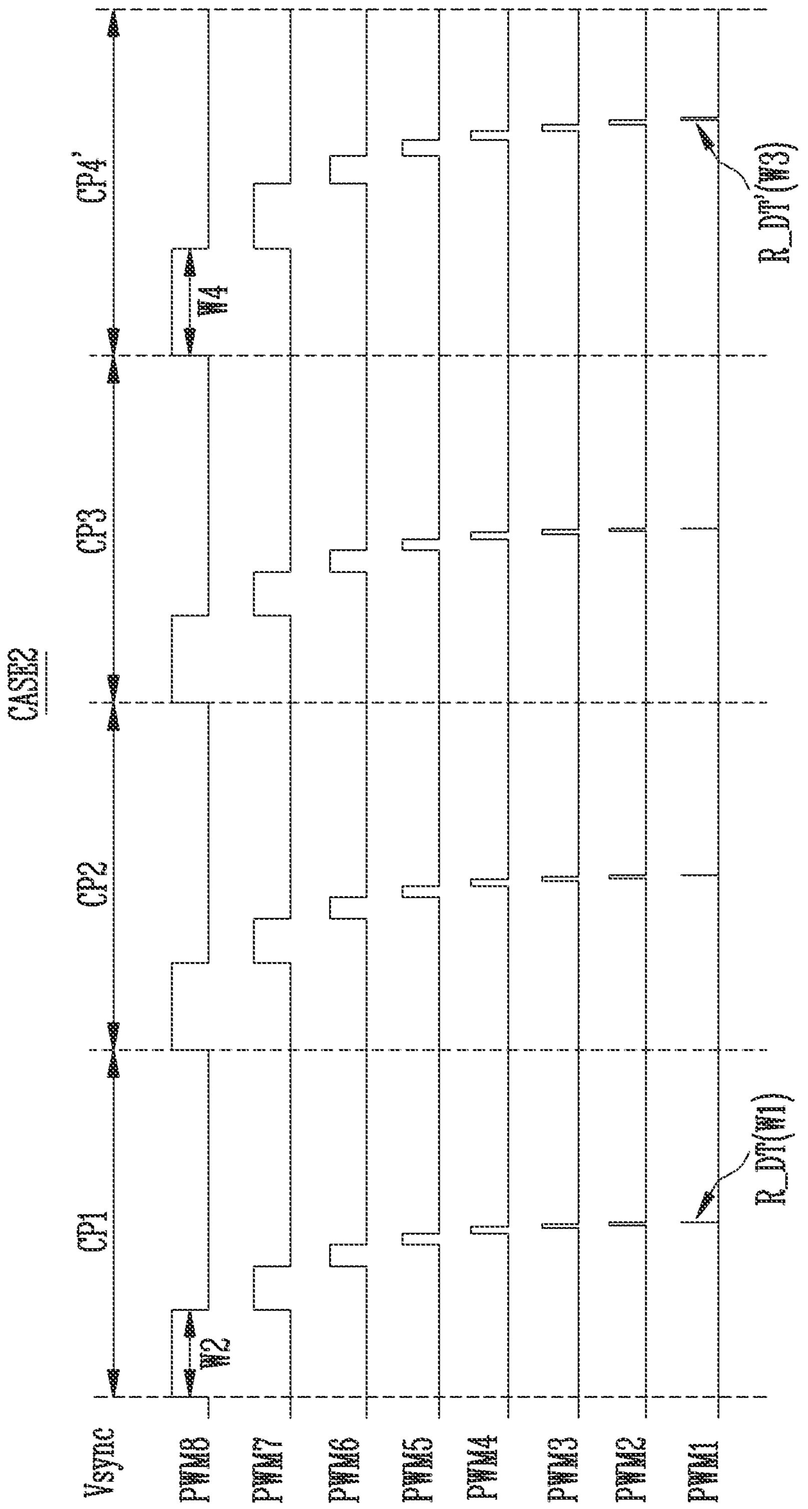
FIG. 9 is a timing diagram illustrating an example of PWM signals output in a second case of FIG. 8.

FIG. 8 is a chart illustrating a change in an emission on-duty according to a change in a reference duty, and FIG. 9 is a timing diagram illustrating an example of PWM signals output in CASE2 of FIG. 8.

Referring to FIGS. 1, 4, 5, 6, 8, and 9, the clock number of the clock signal O_CLK may be determined differently and the emission on-duty in the frame period FR may be varied according to the dimming level of the dimming signal DIM.

FIG. 8 shows the clock number of the clock signal O_CLK corresponding to the reference duty R_DT of the first to fourth cycle periods CP1 to CP4.

For example, in a first case CASE1, the reference duty R_DT of the first to fourth cycle periods CP1 to CP4 may correspond to a clock number of the clock signal O_CLK of 20. The first to eighth emission on-duties DT1 to DT8 may be determined based on the reference duty R_DT. An average of the reference duty R_DT may be clock number, and the first to eighth emission on-duties DT1 to DT8 may be applied substantially the same in the first to fourth cycle periods CP1 to CP4. In addition, the on-duty of the frame period FR in the first case CASE1 may be about 10%, and the display device 1000 may emit light with the dimming luminance corresponding thereto.

In a second case CASE2, the reference duties R_DT of the first to third cycle periods CP1 to CP3 may correspond to the clock number of the clock signal O_CLK of 20, and the reference duty R_DT of the fourth cycle period CP4' (see FIG. 9) may correspond to a clock number of the clock signal O_CLK of 21. In this case, the average of the reference duty R_DT may be a clock number of 20.25.

As shown in FIG. 9, the eighth PWM signal PWM8 may have a second pulse width W2 corresponding to a first pulse width W1 of the first reference duty R_DT of the first cycle period CP1. These PWM signals may also be supplied to the second cycle period CP2 and the third cycle period CP3.

The first reference duty R_DT' of the fourth cycle period CP4' may have a third pulse width W3 corresponding to the clock number of the clock signal O_CLK of 21. Accordingly, the eighth PWM signal PWM8 may have a fourth pulse width W4. The third pulse width W3 may be greater than the first pulse width W1, and the fourth pulse width W4 may be greater than the second pulse width W2.

Accordingly, the on-duty of the frame period FR may be 10%+a in the second case CASE2. Accordingly, light may be emitted with a higher dimming luminance than that of the first case CASE1 in the second case CASE2.

In a third case CASE3, the reference duty R_DT of the first and second cycle periods CP1 and CP2 may correspond to the clock number of the clock signal O_CLK of 20, and the reference duty R_DT of the third and fourth cycle periods CP3 and CP4 may correspond to the clock number of the clock signal O_CLK of 21. In this case, the average of the reference duty R_DT may be a clock number of 20.5. Accordingly, the on-duty of the frame period FR in the third case CASE3 may be 10%+b, and light may be emitted with a higher dimming luminance than that of the second case CASE2 in the third case CASE3.

In a fourth case CASE4, the reference duty R_DT of the first cycle period CP1 may correspond to the clock number of the clock signal O_CLK of 20, the reference duty R_DT of the second, third, and fourth cycle periods CP2, CP3, and CP4 may correspond to the clock number of the clock signal O_CLK of 21. In this case, the average of the reference duty R_DT may be a clock number of 20.75. Accordingly, the on-duty of the frame period FR in the fourth case CASE4 may be 10%+c, and light may be emitted with a higher dimming luminance than that of the third case CASE3 in the fourth case CASE4.

As such, due to the addition of the second, third, and fourth cases CASE2, CASE3, and CASE4, dimming luminance that can be expressed between the dimming luminance that emits light at the reference duty R_DT of all cycle periods by a clock number of 20 and the dimming luminance that emits light at the reference duty R_DT of all cycle periods by a clock number of 21, may be subdivided.

As described above, the display device 1000 according to the embodiments of the present disclosure may vary the reference duty R_DT of the cycle periods CP1 to CP4 of the frame period FR based on the dimming signal DIM. Thus, expressible dimming luminance can be subdivided or expanded while reducing or minimizing the dimming dynamic false contour of the subfield driving method in which the inorganic light emitting element emits light.

Figures 10, 11:
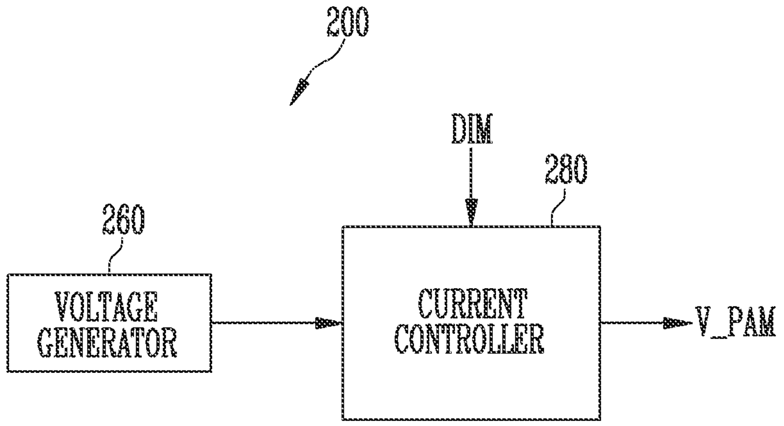
FIG. 10 is a block diagram illustrating an example of a display driver included in a display device of FIG. 1.
FIG. 11 is a chart illustrating a change in a driving current according to a change in a PAM data voltage.

FIG. 10 is a block diagram illustrating an example of a display driver included in a display device of FIG. 1, and FIG. 11 is a chart illustrating a change in a driving current according to a change in a PAM data voltage.

Referring to FIGS. 2, 4, 5, 6, 10, and 11, the display driver 200 may further include a voltage generator 260 and a current controller 280.

The voltage generator 260 may generate the PAM data voltage V_PAM supplied to the pixel 10 in the writing periods WP of the first to eighth subfields SF1 to SF8. In one or more embodiments, as described above, the PAM data voltage V_PAM may be supplied with the same magnitude to the same type of sub-pixels emitting light of the same color regardless of the grayscale (or image data, grayscale data).

Alternatively, the PAM data voltage V_PAM may change according to a reference, grayscale, and/or dimming level (e.g., predetermined reference, grayscale, and/or dimming level). For example, a change in the PAM data voltage V_PAM corresponding to 256 grayscales corresponding to 8-bit image data may be much less than the number of data voltages applied to the organic light emitting element.

The voltage generator 260 may include a gamma voltage generator circuit including various types of voltage generator circuits (e.g., DC-DC converter) and/or a resistor string.

The current controller 280 may control the magnitude of the PAM data voltage V_PAM for each of the first to fourth cycle periods CP1 to CP4 in response to the dimming level of the dimming signal DIM. The current controller 280 may provide the adjusted PAM data voltage V_PAM to the data lines DL. A current (e.g., driving current) of the pixel 10 may be determined based on the PAM data voltage V_PAM.

For example, as shown in FIG. 11, in a first case CASE1', each of the driving currents of the first to fourth cycle periods CP1 to CP4 may be set to correspond to about 50 mA. That is, the PAM data voltages V_PAM supplied in the first to fourth cycle periods CP1 to CP4 may be substantially the same. For example, an average of the driving currents during the time the pixel emits light in the frame period FR, may be about 50 mA.

In a second case CASE2', the driving current of the first to third cycle periods CP1 to CP3 may be set to about 50 mA, and the driving current of the fourth cycle period CP4 may be set to about 55 mA. That is, the PAM data voltage V_PAM supplied during the first to third cycle periods CP1 to CP3 may be different from the PAM data voltage V_PAM supplied during the fourth cycle period CP4. For example, the luminance in the fourth cycle period CP4 may be higher than the luminance in the first cycle period CP1. The average of the driving currents of the pixels during the frame period FR may be about 51.25 mA.

In a third case CASE3', the driving currents of the first and second cycle periods CP1 and CP2 may be set to about 50 mA, and the driving currents of the third and fourth cycle periods CP3 and CP4 may be set to about 55 mA. For example, the average of the driving currents of the pixels during the frame period FR may be quantified as about 52.5 mA. When the emission period (or emission on-duty) is the same, the dimming luminance of the third case CASE3' may be higher than that of the second case CASE2'.

In a fourth case CASE4', the driving current of the first cycle period CP1 may be set to about 50 mA, and the driving current of the second, third, and fourth cycle periods CP2, CP3, and CP4 may be set to about 55 mA. For example, the average of the driving currents of the pixels during the frame period FR may be quantified as about 53.75 mA. When the emission period (or emission on-duty) is the same, the dimming luminance of the fourth case CASE4' may be higher than that of the third case CASE3'.

As such, in addition to controlling the emission period, the PAM data voltage V_PAM may be controlled to vary in each of the cycle periods CP1 to CP4 according to the dimming level, so that the dimming luminance may be further subdivided.

Figure 12:
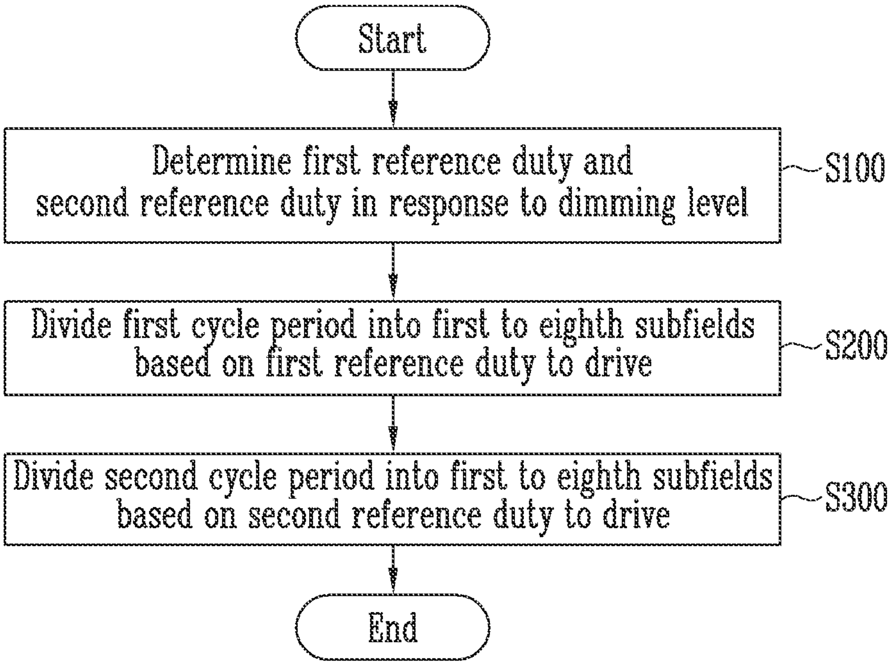
FIG. 12 is a flowchart illustrating a dimming driving method of a display device according to embodiments of the present disclosure.

FIG. 12 is a flowchart illustrating a dimming driving method of a display device according to embodiments of the present disclosure.

Referring to FIG. 12, a dimming driving method of the display device may include determining a first reference duty and a second reference duty, which are minimum emission on-duties set in a first cycle period and a second cycle period of one frame period, respectively, in response to a dimming level included in a dimming signal (S100), dividing the first cycle period into first to eighth subfields based on the first reference duty to drive (S200), and dividing the second cycle period into first to eighth subfields based on the second reference duty to drive (S300).

The first to eighth subfields may have different emission on-duties from each other, and the emission on-duties may correspond to the emission period of the pixel.

In one or more embodiments, the first reference duty and the second reference duty may vary according to the dimming level. For example, the length of the first reference duty may be different from the length of the second reference duty.

The first and second reference duties may be determined based on a clock number of an output of the oscillator. In one or more embodiments, the clock number of the output of the oscillator corresponding to the first reference duty and the clock number of the output of the oscillator corresponding to the second reference duty may be determined in response to the dimming level, and a PWM signal having the first reference duty and a PWM signal having the second reference duty may be generated at each time point by counting the clock number.

Because the driving method of the display device in which the subfield driving is performed for a plurality of cycle periods has been described in detail with reference to FIGS. 1 to 9, a redundant description will be omitted.

Figure 13:
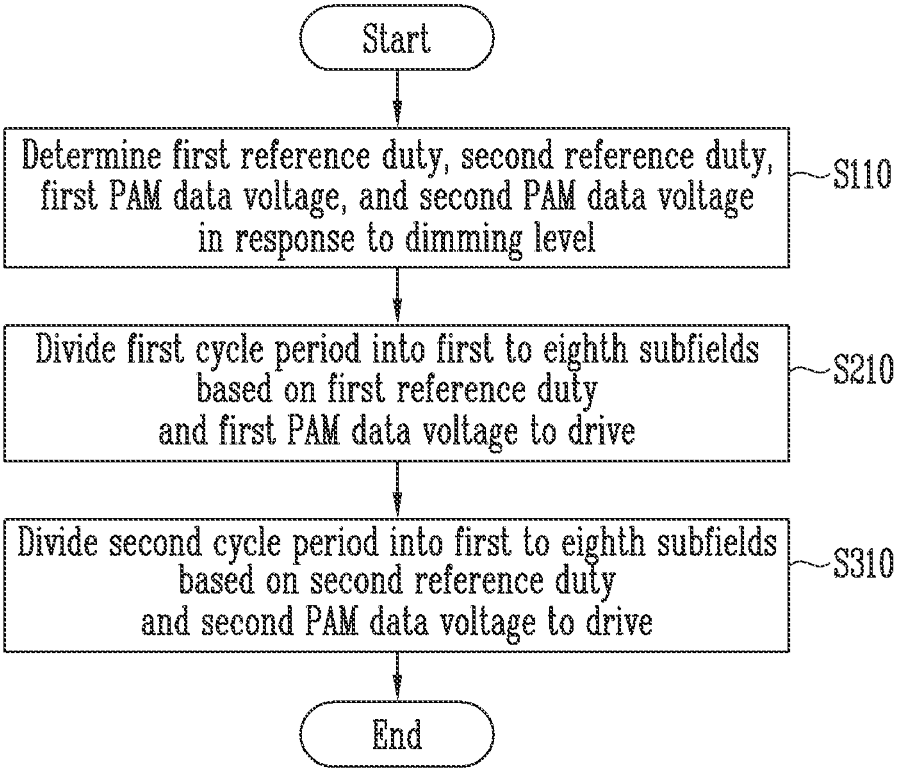
FIG. 13 is a flowchart illustrating an example of a dimming driving method of FIG. 12.

FIG. 13 is a flowchart illustrating an example of a dimming driving method of FIG. 12.

Referring to FIGS. 12 and 13, the dimming driving method of the display device may include determining the first reference duty, the second reference duty, a first PAM data voltage supplied to the pixel during the first cycle period, and a second PAM data voltage supplied to the pixel during the second cycle period in response to the dimming level (S110), dividing the first cycle period into the first to eighth subfields based on the first reference duty and the first PAM data voltage to drive (S210), and dividing the second cycle period into the first to eighth subfields based on the second reference duty and the second PAM data voltage to drive (S310).

In one or more embodiments, the magnitude of the PAM data voltage in cycle periods may vary according to the dimming level. For example, the magnitudes of the first PAM data voltage and the second PAM data voltage may be different from each other. In this case, the current flowing through the inorganic light emitting element of the pixel during the emission period of the first cycle period may be different from the current flowing during the emission period of the second cycle period.

Because such a driving method of the display device has been described in detail with reference to FIGS. 10 and 11, a redundant description thereof will be omitted.

As described above, the display device and the dimming driving method thereof according to the embodiments of the present disclosure can subdivide or expand expressible dimming luminance while reducing or minimizing the dimming dynamic false contour of the subfield driving method in which the inorganic light emitting element emits light by varying the reference duty of the cycle periods of the frame period based on the dimming signal.

While the present disclosure has been shown and described with reference to certain embodiments thereof, it will be understood by those skilled in the art that various changes in forms and details may be made therein without departing from the spirit and scope of the present disclosure as defined by the appended claims and their functional equivalents.

What is claimed is:

1. A display device comprising:

a pixel configured to be driven in cycle periods during a frame period defined by a vertical start signal; and a display driver configured to divide a cycle period into subfields for driving, configured to control an amount of current flowing through the pixel and to control emission on-duties of the subfields, and configured to independently determine, for the cycle period, a reference duty that is a minimum emission on-duty set in the cycle period based on a dimming signal.

2. The display device of claim 1, wherein the pixel comprises an inorganic light emitting element.

3. The display device of claim 1, wherein the cycle period comprises first to eighth subfields having different respective emission on-duties.

4. The display device of claim 3, wherein the frame period comprises first to fourth cycle periods, and wherein the display driver is configured to determine the emission on-duties of the first to eighth subfields of the first cycle period based on a first reference duty, to determine the emission on-duties of the first to eighth subfields of the second cycle period based on a second reference duty, to determine the emission on-duties of the first to eighth subfields of the third cycle period based on a third reference duty, and to determine the emission on-duties of the first to eighth subfields of the fourth cycle period based on a fourth reference duty.

5. The display device of claim 4, wherein a length of one of the first to fourth reference duties is different from a length of another one of the first to fourth reference duties.

6. The display device of claim 4, wherein a length of the first reference duty and a length of the second reference duty are different from each other, and lengths of the emission on-duties of the first to eighth subfields of the first cycle period are different from lengths of the emission on-duties of the first to eighth subfields of the second cycle period, respectively.

7. The display device of claim 4, wherein the display driver comprises:

an oscillator configured to output a clock signal having a preset frequency; and an on-duty controller configured to determine clock numbers corresponding to the first to fourth reference duties in response to a dimming level comprised in the dimming signal, and configured to generate PWM signals respectively having the first to fourth reference duties based on counted value of the clock signal.

8. The display device of claim 7, wherein the on-duty controller is configured to generate PWM signals supplied to the first to eighth subfields of the first cycle period based on the PWM signal having the first reference duty, respectively.

9. The display device of claim 8, wherein the PWM signals are configured to be supplied to the pixel as control signals corresponding to emission periods corresponding to the emission on-duties of the pixel.

10. The display device of claim 7, wherein the display driver further comprises:

a voltage generator configured to generate a PAM data voltage supplied to the pixel in writing periods of the first to eighth subfields; and a current controller configured to control a magnitude of the PAM data voltage for the first to fourth cycle periods in response to the dimming level.

11. The display device of claim 10, wherein a magnitude of one PAM data voltage supplied to the pixel during the first to fourth cycle periods is different from a magnitude of another PAM data voltages supplied to the pixel during the first to fourth cycle periods.

12. The display device of claim 10, wherein a magnitude of the PAM data voltage supplied to the pixel during the first cycle period is different from a magnitude of the PAM data voltage supplied to the pixel during the fourth cycle period.

13. The display device of claim 12, wherein a current flowing into a light emitting element of the pixel during the first cycle period is different from a current flowing into the light emitting element of the pixel during the fourth cycle period.

14. The display device of claim 4, wherein a total emission period corresponding to a sum of the emission on-duties of the frame period is about 30% or less of the frame period.

15. A dimming driving method of a display device comprising:

determining a first reference duty and a second reference duty, which are minimum emission on-duties set in a first cycle period and a second cycle period of a frame period, respectively, and which have different respective lengths, in response to a dimming level of a dimming signal;

dividing the first cycle period into first to eighth subfields based on the first reference duty to drive; and dividing the second cycle period into first to eighth subfields based on the second reference duty to drive.

16. The method of claim 15, wherein the first to eighth subfields have different respective emission on-duties that correspond to an emission period of a pixel.

17. The method of claim 16, wherein respective lengths of the emission on-duties of the first to eighth subfields of the first cycle period are different from respective lengths of the emission on-duties of the first to eighth subfields of the second cycle period.

18. The method of claim 17, wherein the determining the first reference duty and the second reference duty comprises:

determining a clock number of an output of an oscillator corresponding to the first reference duty, and a clock number of an output of the oscillator corresponding to the second reference duty, in response to the dimming level; and generating a PWM signal having the first reference duty and a PWM signal having the second reference duty by counting the clock number.

19. The method of claim 17, further comprising:

determining a first PAM data voltage supplied to the pixel in the first cycle period, and a second PAM data voltage having a different magnitude than the first PAM data voltage and supplied to the pixel in the second cycle period, in response to the dimming level;

supplying the first PAM data voltage to the pixel in the first cycle period; and supplying the second PAM data voltage to the pixel in the second cycle period.

20. The method of claim 19, wherein the pixel comprises an inorganic light emitting element, and wherein a current flowing through the inorganic light emitting element during an emission period of the first cycle period is different from a current flowing through the inorganic light emitting element during an emission period of the second cycle period.

* * * * *